United States Patent [19]
McClaine et al.

[11] Patent Number: 5,992,041
[45] Date of Patent: Nov. 30, 1999

[54] RAINING BED HEAT EXCHANGER AND METHOD OF USE

[75] Inventors: Andrew W. McClaine, Lexington, Mass.; Ronald W. Breault, Newington, N.H.; Anthony F. Litka, Hanover; Fred E. Becker, Reading, both of Mass.

[73] Assignee: Thermo Power Corporation, Waltham, Mass.

[21] Appl. No.: 08/989,882

[22] Filed: Dec. 12, 1997

[51] Int. Cl.⁶ .................................................. F26B 17/12
[52] U.S. Cl. .............................................................. 34/178
[58] Field of Search ................................ 34/168, 169, 79, 34/82, 178; 432/96, 95

[56] References Cited

U.S. PATENT DOCUMENTS

| | | |
|---|---|---|
| 1,747,740 | 2/1930 | Smith . |
| 2,199,384 | 5/1940 | Azbe . |
| 2,345,067 | 3/1944 | Osann . |
| 2,628,829 | 2/1953 | Ruiz . |
| 2,742,276 | 4/1956 | Azbe . |
| 3,142,480 | 7/1964 | Azbe . |
| 3,285,590 | 11/1966 | Parsons . |
| 3,392,969 | 7/1968 | Muller . |
| 3,423,840 | 1/1969 | Beeken . |
| 4,002,422 | 1/1977 | Escott . |
| 4,210,632 | 7/1980 | Rourke . |
| 4,256,451 | 3/1981 | Johnson, Jr. ............................. 432/14 |
| 4,289,481 | 9/1981 | Yano ........................................ 432/96 |
| 4,473,352 | 9/1984 | Sonoda et al. . |
| 4,596,079 | 6/1986 | Hamada . |
| 4,740,157 | 4/1988 | D'Agrosa . |
| 4,747,773 | 5/1988 | Predescu et al. . |
| 4,875,919 | 10/1989 | DeSaro et al. ............................. 65/27 |
| 4,948,364 | 8/1990 | Thompson . |
| 5,125,943 | 6/1992 | Cole ........................................... 65/27 |

FOREIGN PATENT DOCUMENTS

| | | |
|---|---|---|
| 1151535 | 1/1958 | France . |

Primary Examiner—Henry Bennett
Assistant Examiner—Malik N. Drake
Attorney, Agent, or Firm—Fish & Richardson P.C.

[57] ABSTRACT

A raining bed heat exchanger includes: a hollow stack; a feed inlet located near the top of the stack for introducing particulate material into the stack so that the material falls through the stack; a gas inlet located near the bottom of the stack for introducing rising gases into the stack so that the gases flow counter to the falling material; a plurality of baffles supported within the stack between the feed and gas inlets for retarding the falling material and prolonging its exposure to the gases; and a disengagement section located near the top of the stack for separating from the gases particulates entrained by the rising gases. The disengagement section includes a screen positioned within the stack and having a plurality of gaps through which the rising gases pass in order to sufficiently separate the entrained particulates. Alternatively, the disengagement section can include a filter media to separate the entrained particulates. Also, at least one of the baffles can include a hollow tube and refractory insulation surrounding the hollow tube. The heat exchanger can be connected to a cyclone to form a heat exchanger system that includes a flow generating mechanism adapted to continuously reintroduce particulates separated by the cyclone back into the heat exchanger.

33 Claims, 10 Drawing Sheets

RAINING BED HEAT EXCHANGER AND METHOD OF USE

BACKGROUND OF THE INVENTION

This invention relates to heat exchangers and their methods of use.

Heat exchangers provide a structure in which thermal energy can be transferred from a hot medium to a cold medium. In particular, a heat exchanger may provide a structure in which a flame or hot gases heat, melt, or drive chemical reactions in particulate material. For example, in glass manufacture, a furnace melts glass batch feedstock and cullet (recycled glass) using a flame formed from natural gas, oil, or coal, and preheated combustion air. Radiation from the flame and furnace enclosure transfer heat to the melt. In some cases, a separate heat exchanger preheats the glass batch and cullet using hot exhaust gases from the furnace.

In another example, a calciner furnace heats limestone ($CaCO_3$) to drive off carbon dioxide ($CO_2$) and calcine the limestone into lime (CaO). One type of calciner includes a pair of connected silos in which natural gas is burned between the silos. During its use, limestone is fed into each of the silos. Then, air is drawn into one of the silos and passes through the natural gas flame, which heats the air. The heated air then passes through the second silo and transfers the heat to the limestone in that silo to drive the calcination reaction. After a time, the direction of the air flow between silos is reversed to heat the limestone in the first silo.

A rotary kiln can also be used as a calciner. A rotary kiln includes a large rotating pipe oriented at a small angle from the ground. Particulate material flows through the pipe from top to bottom and is heated by counter flowing hot gases. Rotation of the pipe mixes and breaks up the particulate flow to provide even heating. In addition, the rotary kiln can include chains hanging within the pipe to further break up the particulate flow and to transfer heat to the particulate material.

In all cases, the design of a heat exchanger attempts to optimize the efficiency of the thermal transfer process. The sizes of the particulate material can affect this efficiency. For example, in the connected-silo calciner, the spaces between the chunks of limestone fed into the silos must be sufficiently large to provide a passage for the air flow with an acceptable pressure drop. Also, in the rotary kiln, small particulates can "blanket" larger particulates and prevent heat transfer to these larger particulates. Another concern is the loss of small particulates to exhaust gases from the heat exchanger.

SUMMARY OF THE INVENTION

The invention features a heat exchanger in which hot (or cold) rising gases introduced at the bottom of the heat exchanger heat (or cool) a raining bed of falling particulate material introduced at the top of the heat exchanger. The heat exchanger includes baffles that retard the falling material and increase the contact time between the gases and the material. The heat exchanger can be used to preheat and partially calcine limestone before delivering the preheated limestone to a calciner furnace that completely calcines the limestone to lime. The heat exchanger can efficiently cool the exhaust gases from the calciner furnace by using them as the hot inlet gases in the heat exchanger. The heat exchanger includes air-cooled baffles and internal insulation to accommodate the high temperatures required to preheat and partially calcine limestone. The heat exchanger can also be used to preheat glass batch and cullet feedstock before melting the feedstock in a glass furnace.

There is a disengagement section at the top of the heat exchanger for separating from the rising gases smaller particulates entrained by the gases. The disengagement section includes a screen that prevents pluming of the rising gases and produces a more uniform velocity distribution in the vicinity of the screen. As a result, the entrained particulates settle out of the gas flow both above and below the screen. Those particulates that settle out above the screen can settle on and subsequently fall back through the screen. As the particulates settle out of the gas flow, they can cluster and agglomerate with one another, thereby forming larger particulates that fall back through the heat exchanger without being re-entrained by the rising gases. In an alternate embodiment, a filter such as a baghouse can be positioned in the disengagement section in place of the screen. The porosity of the filter allows the rising gases to pass through the filter and traps the particulates entrained by the gases.

A cyclone can be used together with the heat exchanger to further recapture particulates that remain entrained in the gas flow after passing through the disengagement section. A pipe connects the base of the cyclone to the heat exchanger so that a flow generating mechanism, such as an eductor or rotary valve, can continuously reintegrate into the heat exchanger the particulates captured by the cyclone.

In general, in one aspect, the invention features a raining bed heat exchanger including: a hollow stack; a feed inlet located near the top of the stack for introducing particulate material into the stack so that the material falls through the stack; a gas inlet located near the bottom of the stack for introducing rising gases into the stack so that the gases flow counter to the falling material; a plurality of baffles supported within the stack between the feed and gas inlets for retarding the falling material and prolonging its exposure to the gases; and a disengagement section located near the top of the stack for separating from the gases particulates entrained by the rising gases. The disengagement section includes a screen positioned within the stack and having a plurality of gaps through which the rising gases pass in order to sufficiently separate the entrained particulates.

The heat exchanger can include any of the following features. The feed inlet introduces the particulate material into the stack below the screen. The gaps in the screen can be uniformly distributed. The total area of the gaps can be less than about one fifth of the total area of the screen, or less than about one tenth of the total area of the screen. The heat exchanger can also include a mechanical vibrator connected to the screen. The screen can include downward sloping surfaces that narrow toward one another to provide the plurality of gaps. For example, the screen can include a plurality of rods having a triangular cross-section, wherein the rods are spaced from one another to provide the plurality of gaps.

Also, the cross-sectional area of the disengagement section can increase with height. The disengagement section can further include a duct on a side of the stack through which the rising gases exit the heat exchanger, and wherein the interior volume of the disengagement section above the screen increases in the direction of the duct. At least one of the baffles in the heat exchanger can include a hollow tube and refractory insulation surrounding the hollow tube. The interior of the hollow tube can communicate with the ambient environment to cool the baffle. The hollow tube can be made of steel. At least one of the baffles can also include an abrasion resistant layer covering at least the upper portion of the refractory material. The abrasion resistant layer can be made from stainless steel, refractory tile, or glass.

In another aspect, the invention features a heat exchanger system including the heat exchanger described above, a cyclone, and a duct connecting the disengagement section to the cyclone and wherein the rising gases pass through the duct to the cyclone.

The heat exchanger system can include any of the following features. The system can include a pipe connecting the base of the cyclone to the stack below the disengagement section so that particulates separated from the gases by the cyclone are reintroduced into the stack. The system can include an eductor to draw the particulates separated by the cyclone through the pipe and into the heat exchanger. The system can include a rotary valve in the pipe to drive the particulates separated by the cyclone through the pipe and into the heat exchanger.

In general, in another aspect, the invention features a raining bed heat exchanger including: a hollow stack; a feed inlet located near the top of the stack for introducing particulate material into the stack so that the material falls through the stack; a gas inlet located near the bottom of the stack for introducing rising gases into the stack so that the gases flow counter to the falling material; and a plurality of baffles supported within the stack between the feed and gas inlets for retarding the falling material and prolonging its exposure to the gases. At least one of the baffles comprises a hollow tube and refractory insulation surrounding the hollow tube.

The heat exchanger can include any of the following features. The hollow tube can be made of steel. The interior of the hollow tube can communicate with the ambient environment to cool the baffle. At least one of the baffles can include an abrasion resistant layer covering at least an upper portion of the refractory insulation. The abrasion resistant layer can be made from stainless steel, refractory tile, or glass.

In general, in another aspect, the invention features a heat exchanger system including: a raining bed heat exchanger having a hollow stack, a feed inlet located near the top of the stack for introducing particulate material into the stack so that the material falls through the stack, a gas inlet located near the bottom of the stack for introducing rising gases into the stack so that the gases flow counter to the falling material, a plurality of baffles supported within the stack between the feed and gas inlets for retarding the falling material and prolonging its exposure to the gases, and a duct in the stack above the feed inlet through which the rising gases exit the heat exchanger; a cyclone connected to the heat exchanger by the duct for separating from the gases particulates entrained by the gases in the heat exchanger; a pipe connecting the base of the cyclone to the heat exchanger below the feed inlet so that particulates separated from the gases by the cyclone are reintroduced to into the heat exchanger, and a flow generating mechanism adapted to continuously pull the particulates separated by the cyclone through the pipe and into the heat exchanger. The flow generating system in the heat exchanger system can be, for example, an eductor or a rotary valve.

In general, in another aspect, the invention features a raining bed heat exchanger including: a hollow stack; a feed inlet located near the top of the stack for introducing particulate material into the stack so that the material falls through the stack; a gas inlet located near the bottom of the stack for introducing rising gases into the stack so that the gases flow counter to the falling material; a plurality of baffles supported within the stack between the feed and gas inlets for retarding the falling material and prolonging its exposure to the gases; and a disengagement section located near the top of the stack for separating from the gases particulates entrained by the rising gases. The disengagement section includes a filter positioned within the stack having a porosity that allows the rising gases to pass through the filter and traps the particulates entrained by the rising gases. The filter can be, for example, a baghouse. The heat exchanger can include shielding in the stack below the filter for forming a quiescent zone. Also, the feed inlet can include a duct that introduces particulate material into the stack below the filter.

In general, in another aspect, the invention features a method of calcining limestone into lime involving the steps of: introducing limestone into a heat exchanger near its top; allowing the limestone to fall downward through the heat exchanger while introducing hot gases near the bottom of the heat exchanger; allowing the hot gases to directly contact and flow counter to the falling limestone, thereby heating the limestone; retarding the falling limestone within the heat exchanger and thereby lengthening the contact time between the limestone and the hot gases; and collecting the heated limestone and delivering it to a calciner furnace to completely calcine the heated limestone into lime.

The calcining method can include any of the following features. The hot gases can be exhaust gases from the calciner furnace. The hot gases being introduced into the heat exchanger can have a temperature greater than about 1600° F., or in the range of about 1900 to 2000° F. The limestone can be heated in the heat exchanger to a temperature of greater than about 1200° F.

The invention includes many advantages. For example, the heat exchanger can efficiently cool the exhaust gases from an upstream process by using them as the inlet gases in the heat exchanger. The disengagement section reduces the fraction of particulates entrained in the gas exhaust of the heat exchanger. In particular, the screen allows small entrained particulates to settle out of the gas flow, agglomerate with one another, and fall back through the heat exchanger where they are subsequently collected. Furthermore, the screen requires little, if any, maintenance. The cyclone and the flow generating mechanism further recapture entrained particulates and return them to the heat exchanger.

Particulate recapture reduces the emission of particulates into the ambient environment and prevents the waste of feed material. Furthermore, small particulates (e.g., less than a quarter inch in diameter) can be introduced into the heat exchanger and effectively preheated without being lost to the exhaust gases. Also, by recapturing and continuously reintroducing the particulates captured by the gas flow, the composition of the particulate material fed into the heat exchanger is substantially the same as the preheated particulate material output from the base of the heat exchanger.

Other features and advantages of the invention will be apparent from the following detailed description, and from the claims.

DETAILED DESCRIPTION

Heat Exchanger

Figure 1:
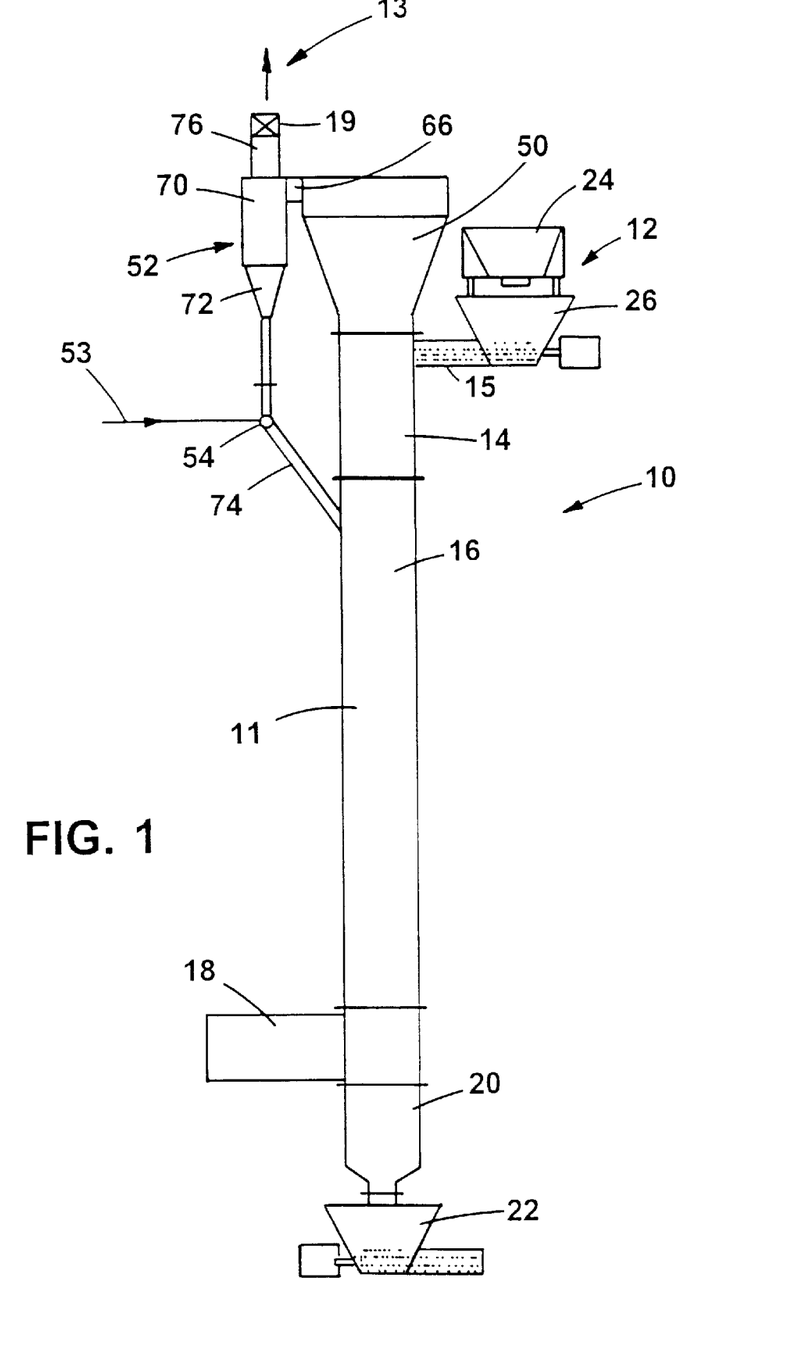
FIG. 1 is a schematic of a raining bed heat exchanger.

Referring to FIG. 1, a schematic of a raining bed heat exchanger 10 is shown. The heat exchanger includes a hollow stack 11 that is typically about 25 to 35 feet high and typically has a rectangular internal cross-sectional area of about 8 to 100 square feet. The outer footprint of the stack including insulation and support columns typically has a cross-sectional area of about 25 to 140 square feet. A feeder system 12 supplies solid particulate material into stack 11 through a distribution section 14 near the top of heat exchanger 10. The particulate material falls within stack 11 driven by gravity forces from distribution section 14 through an active section 16. Hot gases introduced through a hot gas inlet 18 flow up into active section 16 and heat the falling particulate material. A fan 19 in a cyclone 52 connected to stack 11 near the top of the heat exchanger draws the gases upward in the direction of arrow 13. The heated particulate material collects in a hopper section 20, which subsequently releases the collected material into a bottom charger 22 that carries the heated material to a subsequent processing or storage site.

The heat exchanger can be used as a preheater for a subsequent process that further processes, e.g., melts or thermally reacts, the heated particulate matter. In this case, the preheater preheats the particulate material to a temperature at which the material remains easy to handle, e.g., the material is not molten or sticky, and which increases the efficiency and speed of the downstream process. Typically, hot exhaust gases from the subsequent process are efficiently cooled by using them as the hot inlet gases in the preheater. For example, the preheater can preheat glass batch and cullet to a temperature of about 1000° F. using 1300° F. exhaust gases from a glass furnace, which subsequently melts the preheated glass batch and cullet. Arrangements for efficiently integrating a preheater, such as heat exchanger 10, with a glass furnace are described in Desaro et al. (U.S. Pat. No. 4,875,919), the contents of which are incorporated by reference. As will be described in greater detail below, heat exchanger 10 can also be used as a preheater to partially calcine limestone to lime by using exhaust gases from a calciner as the hot inflow gases for the preheater.

Feeder system 12 includes a batch hopper 24 which receives the particulate material to be heated from a bucket elevator or a pneumatic transport system. Batch hopper 24 drops the material into a top charger 26 which contains a rotating screw feeder that drives the particulate material into distribution section 14. The material in the screw feeder and above top charger 26 provides a seal that prevents outside air from infiltrating into distribution section 14 where the pressure is typically 2 to 5 inches of water below atmospheric pressure. A conveyor belt 15 extending into distribution section 14 carries the particulate matter across the central cross-section of the heat exchanger. The motor for the conveyor belt is located outside the distribution section where temperatures are more moderate. Diverters (not shown) located immediately above and along the length of the conveyor belt, scrape the particulate material from the belt and spread the flow of particulate material across the distribution section. After the diverters push the material off the belt, the material falls on a series of baffles, which further divide and spread the particulate matter. The diverters and baffles in the distribution section are typically made of stainless steel or other high alloy material and extend from, and are supported by, the sides of heat exchanger 10. Together, the conveyor belt, diverters, and baffles uniformly spread the falling particulate matter across the full cross-section of the heat exchanger.

In other embodiments, for example, the feeder system can include multiple hoppers and chargers so that particulate material enters the distribution section from more than one location. A vibratory screen feeder can also be used in place, or in addition to, the rotating screw feeder.

Figure 2:
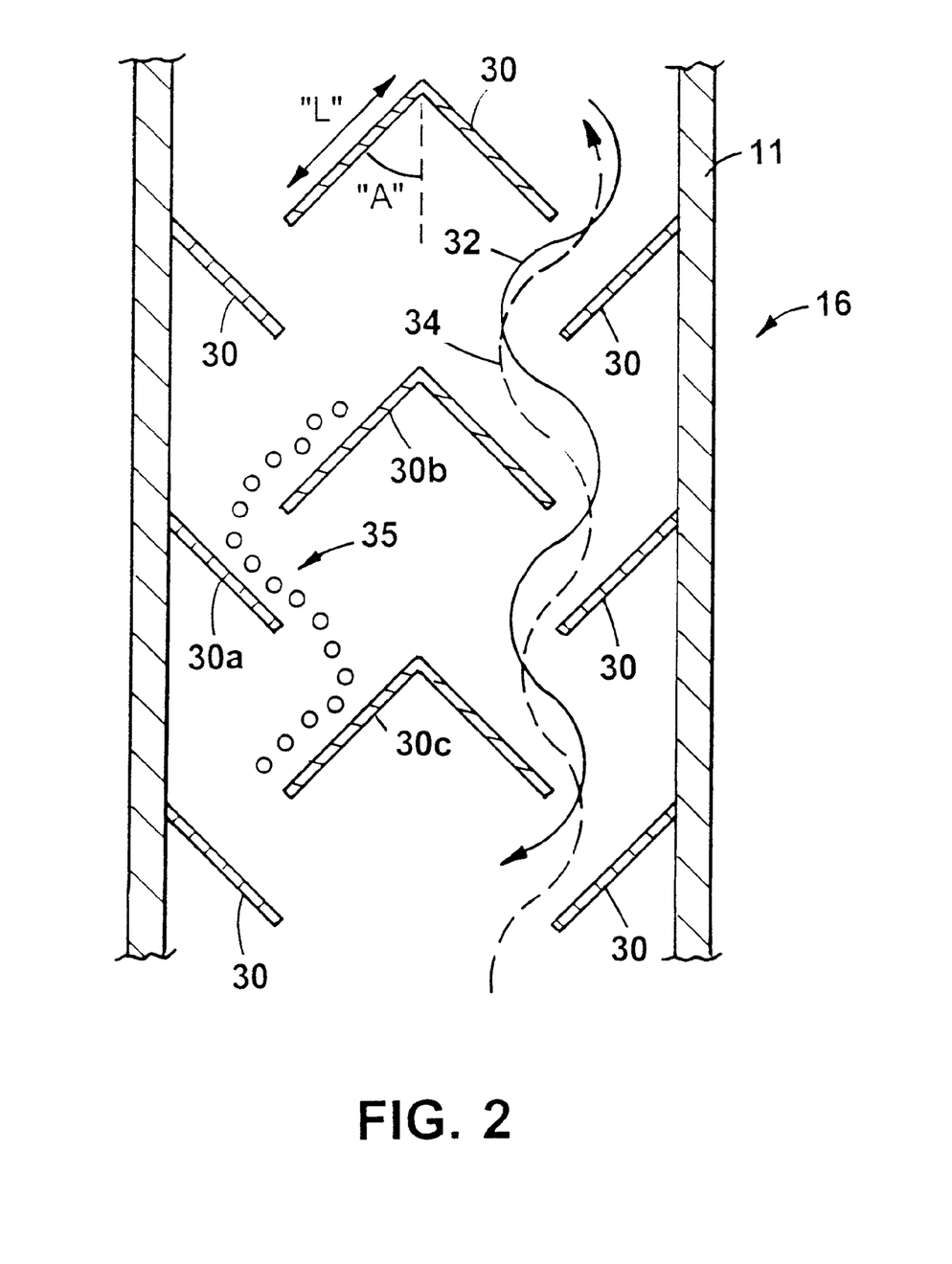
FIG. 2 is a schematic of a representative portion of the active section in the heat exchanger shown in FIG. 1.

From distribution section 14, the uniformly distributed particulate material falls into an active section 16. Referring to FIG. 2, active section 16 includes a number of strategically-placed baffles 30 that deflect the falling particulate material and guide it along a "zig-zag" path 32, thereby retarding the falling material and increasing its residence time within active section 16. This increased residence time increases the heat transferred to the falling particulate matter from the upward flowing hot gases 34, which are also deflected by the baffles. Baffles 30 extend from one side of heat exchanger to the opposite side of the heat exchanger along a direction perpendicular to the cross-sectional view shown in FIG. 2 and provide a downward sloping surface for the falling particulate material.

The spacings between baffles determine the maximum velocity of the upward flowing gases and the contact time between falling particulate material and rising gases. The downward angle "A" and downward length "L" of baffles 30, as well as the overall height of active heating section 16, determine the residence time of the particulate material. The size of angle "A" and the smoothness of the baffle surfaces are sufficient to allow the heated particulate material to slide along the baffle surface without sticking to them. Materials like smooth finish stainless steel, smooth superalloy metals, smooth finish silicon carbide, or a fine grained refractory metal provide sufficient smoothness for baffles 30. For example, an appropriate material is stainless steel with a 2B finish, which is available from Ryerson Company (Chicago, Ill.). A suitable baffle angle "A" is in the range of about 20 to 70 degrees, or more particularly, in the range of about 40 to 60 degrees. The baffle length "L" is such that particulate material 35 typically lands on the upper third of a lower baffle (e.g., baffle 30a) when sliding off of an upper baffle (e.g., baffle 30b). A suitable baffle length is in the range of about 4 to 18 inches, or more particularly in the range of about 7 to 12 inches. As the material lands on the lower baffle, it stops, then it begins to slide to the lower end of the baffle, after which the material has gathered sufficient speed to carry it across the rising gas flow to a subsequent baffle (e.g., baffle 30c). Optimal geometries, spacings, and locations for the baffles in active section 16 are also described in DeSaro et al. (U.S. Pat. No. 4,875,919), the contents of which are incorporated by reference.

Figure 3A:
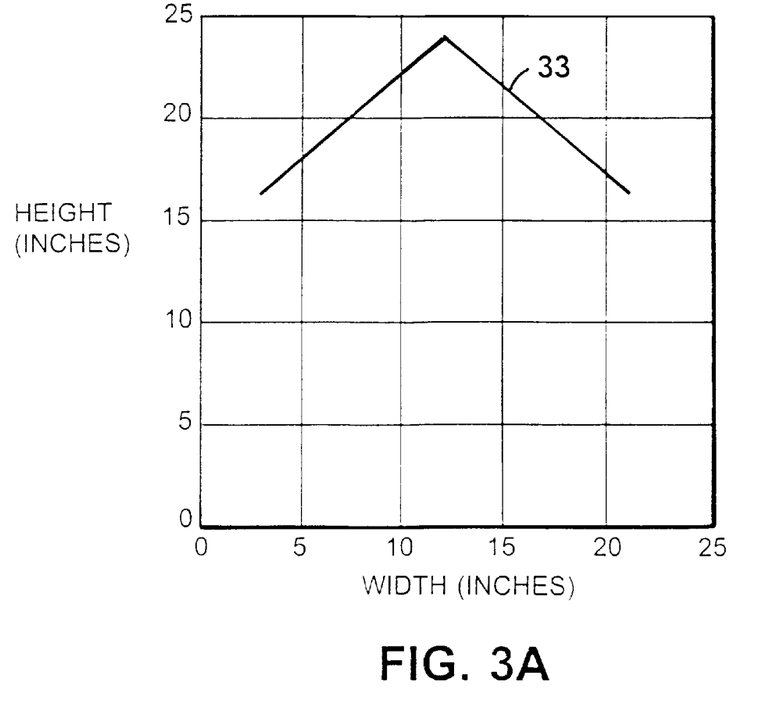
FIGS. 3A, 3B, and 3C are cross-sectional diagrams illustrating various baffle shapes.
Figure 3B:
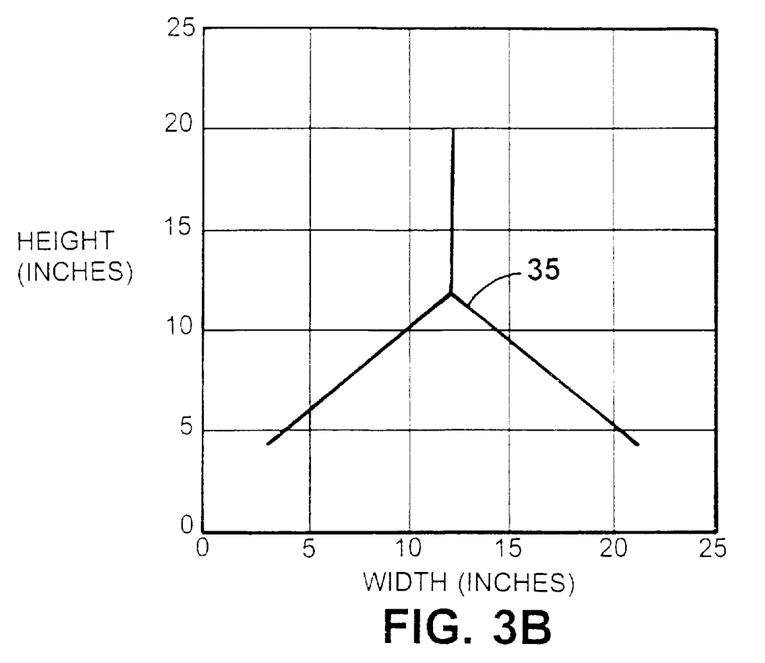
Figure 3C:
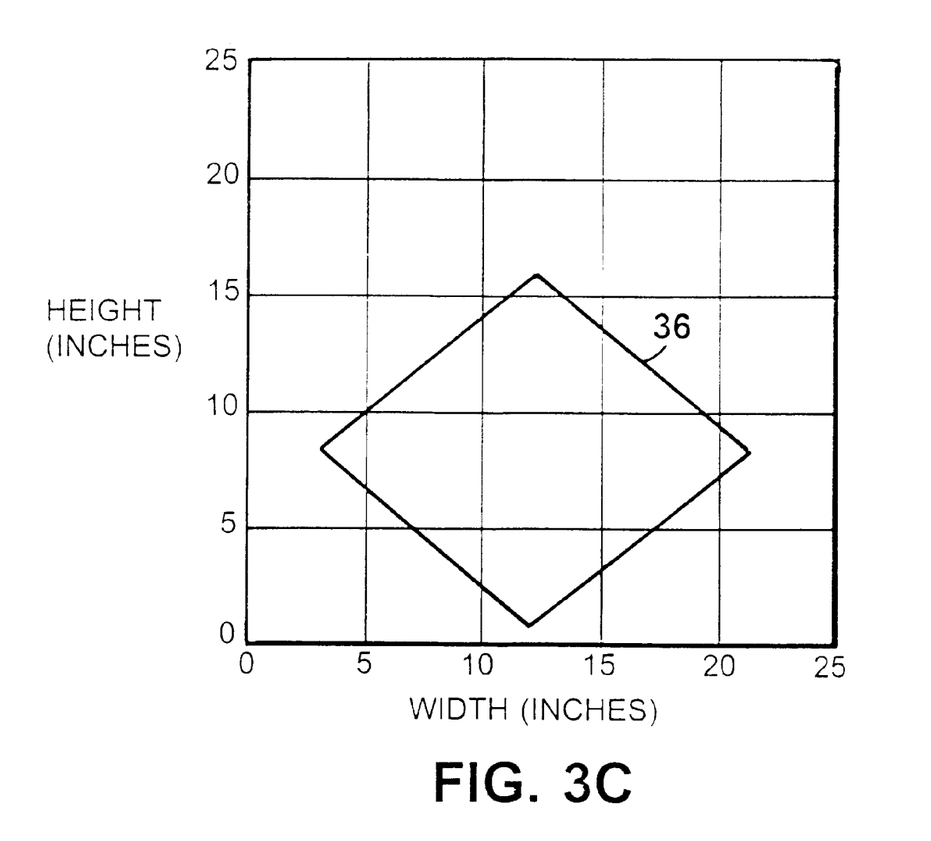

In addition to the inverted-"V"-shaped baffle 30 shown in FIG. 2 and diagrammed as baffle shape 33 in FIG. 3A, the baffles in active section 16 can also have other shapes, such as a three-vaned baffle 35 as in FIG. 3B and a diamond-shaped baffle 36 as in FIG. 3C. FIGS. 3A, 3B, and 3C illustrate these baffle shapes with exemplary dimensions. Mixtures of these baffle shapes are also possible.

For heat exchangers used at moderate temperatures, e.g., those below about 1400° F., the baffles in active section 16 are typically made from quarter inch thick sheets of stainless steel. At larger temperatures, such as those that are reached if heat exchanger 10 is used to precalcine limestone, many metals, including stainless steel, will exhibit "creep", i.e., the metal will warp and bend. Creep in the baffles will affect the aerodynamics within active section 16 and negatively affect the performance of the heat exchanger. In these cases, the baffles in active section 16 must include additional support.

Figure 4A:
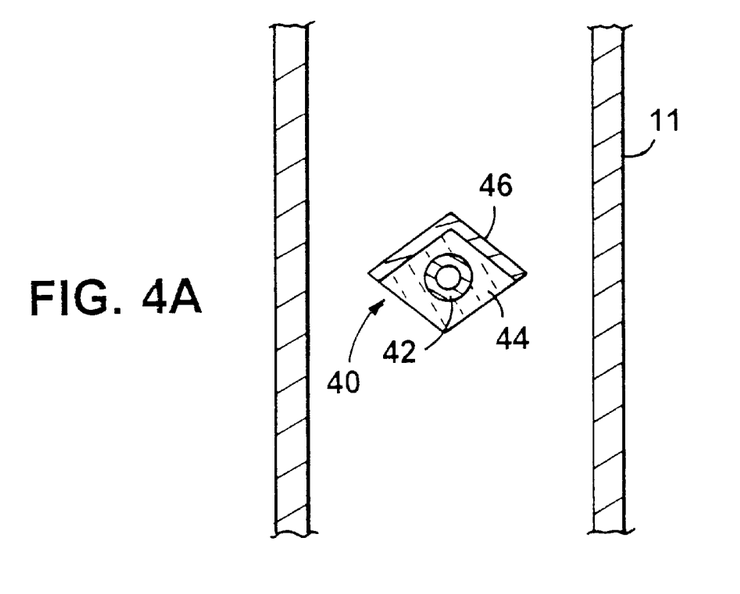
FIGS. 4A and 4B are cross-sectional perpendicular views of a high-temperature baffle.
Figure 4B:
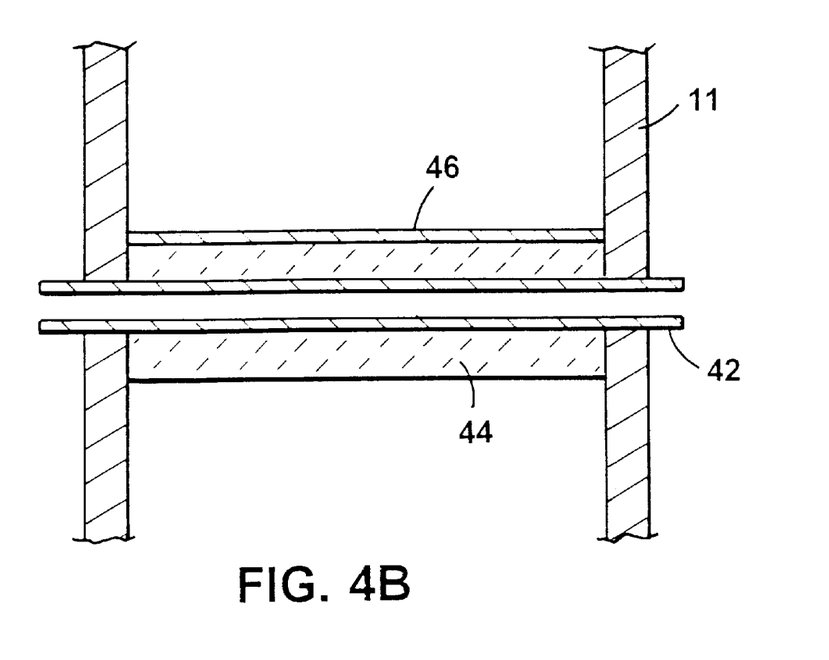

A suitable high-temperature baffle design is shown in FIGS. 4A and 4B. FIG. 4A is a cross-sectional view of a high-temperature baffle 40 within active section 16. Baffle 40 includes an air-cooled metal pipe 42 surrounded by refractory insulation 44 having a smooth abrasion-resistant material 46, such as quarter-inch stainless steel, on its upper surface. As shown in FIG. 4B, which is a cross-sectional view of baffle 40 perpendicular to the view in FIG. 4A, pipe 42 extends through opposite walls of stack 11 so that relatively cool air outside the heat exchanger can flow through pipe 42. The cool air passing through pipe 42 and refractory insulation 44 surrounding the pipe prevent the pipe from reaching a temperature at which it exhibits creep. Refractory insulation 44 also prevents air-cooled pipe 42 from cooling the upward-flowing hot gases. Pipe 42 supports the abrasion resistant material 46 which deflects the falling particulate material as described above. Many types of refractory insulation tend to have poor abrasion resistance, so material 46 also protects the refractory insulation 44 from damage by the falling particulate material. To manufacture the baffles, a castable refractory insulation is molded around the metal (e.g., steel) pipe, then, for example, quarter-inch stainless steel is cut into the appropriate size, bent into the appropriate angle, and then mounted onto the refractory insulation for use as material 46. In other embodiments, material 46 can be fabricated from glass, abrasion resistant refractory, or refractory tile depending on the application. Alternatively, the high-temperature baffle can be made entirely from refractory insulation surrounding an air-cooled pipe, wherein the upper surface of the refractory insulation is abrasion resistant and sufficiently smooth.

The rate at which a particulate falls through heat exchanger 10 depends on the downward force of gravity on the particulate. This force is proportional to the mass of the particulates, the "drag" on the particulate, which is proportional to the surface area of the particulate, and the upward force on the particulates provided by the rising gases. While large particulates in the particulate material (which have relatively large mass to drag ratios) fall through the heat exchanger, small particulates in the particulate material (which have relatively small mass to drag ratios) can be captured by the rising gases and carried up through heat exchanger 10. This separation of falling large particulates and rising small particulates is known as elutriation. Unless otherwise compensated for, the rising small particulates will be released into the atmosphere as exhaust, thereby wasting starting material and polluting the environment. To prevent this and as shown in FIG. 1, heat exchanger 10 includes a disengagement section 50 and cyclone 52, which is connected to a pneumatic eductor 54, as two mechanisms for reintegrating into active section 16 small particulates captured by the rising gases.

Figure 5A:
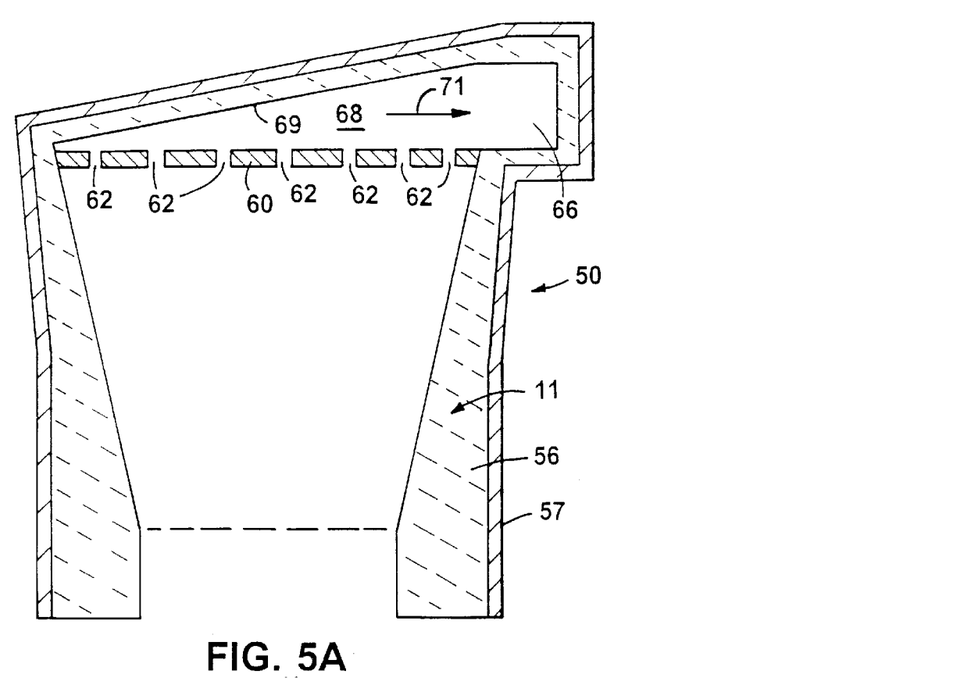
FIGS. 5A, 5B, and 5C are schematics of two embodiments of the disengagement section in the heat exchanger shown in FIG. 1.

Disengagement section 50, which is above distribution section 14 and is shown in greater detail in FIG. 5A, has an interior with an increasing cross-sectional area. Increasing the cross-sectional area can be accomplished by increasing the overall area of the disengagement section or decreasing refractory liner 56 on the interior of disengagement section 50. Refractory liner 56 is used as insulation between the interior of stack 11 and a supporting structure 57 for the stack. Since the temperature of the gases in the disengagement section is relatively low compared to the hot gases entering from the bottom of heat exchanger 10, both methods can be used. A suitable increase in cross-sectional area is an increase by a factor in the range of about 2 to 8 over a 3 to 6 foot increase in height.

Disengagement section 50 also includes a screen 60 that spans the width and length of the interior of the disengagement section, is substantially transverse to stack 11, and has a plurality of uniformly distributed gaps 62. Screen 60 prevents pluming of the rising gases and forces the rising gases to spread out over the cross-section of the disengagement section above the screen, thereby reducing both the peak and average velocity of the rising gases. By reducing the area through which the rising gases can pass, screen 60 produces a pressure drop in the disengagement section. A suitable pressure drop is in excess of about five times the velocity pressure (i.e., the force that would be exerted by the particle laden gas stream per unit area) of the rising gases, and more particularly, in excess of about ten times the velocity pressure of the rising gases. This can be accomplished by proportionally scaling the total open area provided by the gaps. For example, to produce a pressure drop of about ten times the velocity pressure of the rising gases, the total open area provided by the gaps should be about one tenth of the total area of the screen. The screen can be made from metal, such as stainless steel, or ceramics or plastic that can withstand the high temperature conditions within the disengagement section.

As the rising gases and trapped small particulates rise into the disengagement section, the velocity of the rising gases tends to decrease as the cross-sectional area of the stack increases. Furthermore, as the rising gases approach screen 60 from below, screen 60 forces the rising gases to spread out and pass through the distributed gaps 62, producing a substantially uniform velocity distribution above screen 60. Since screen 60 forces the rising gases to spread out over a wider area, it further decreases the velocity of the rising gases. As the velocity of the gas decreases below the terminal velocity of particulates trapped in the gas (as determined by the relative size of the particulate), the particulates fall through the gas stream and settle on screen 60. A mechanical vibrator is connected to the screen to encourage particulates that settle on screen 60 to fall back through gaps 62. As the particulates settle on screen 60 and fall back through gaps 62, they tend to agglomerate and cluster with one another, so that smaller particulates combine to form larger particulates. Thereafter, many of these larger particulates will fall back through the heat exchanger without being recaptured by the rising gases. In this way, the screen and the increasing cross-sectional area in the disengagement section recapture elutriated particulates. Disengagement section 50 can also include guide vanes above or below screen 60 to further spread out and divide the gas flow.

Figure 6A:
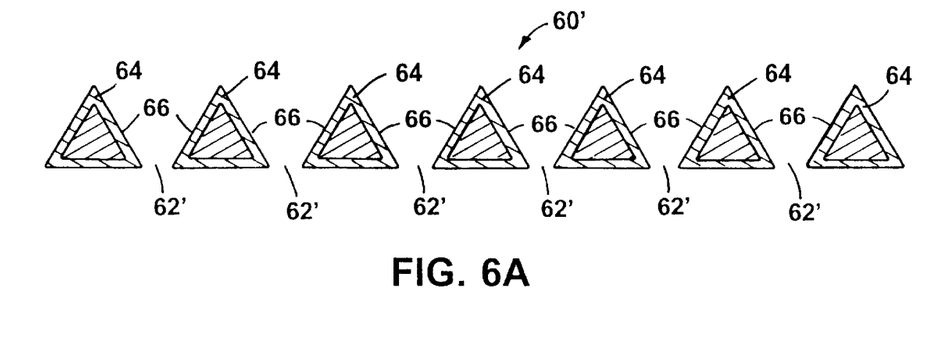
FIGS. 6A and 6B are cross-sectional and plan views, respectively, of a screen for the disengagement section shown in FIGS. 5A, 5B, and 5C.
Figure 6B:
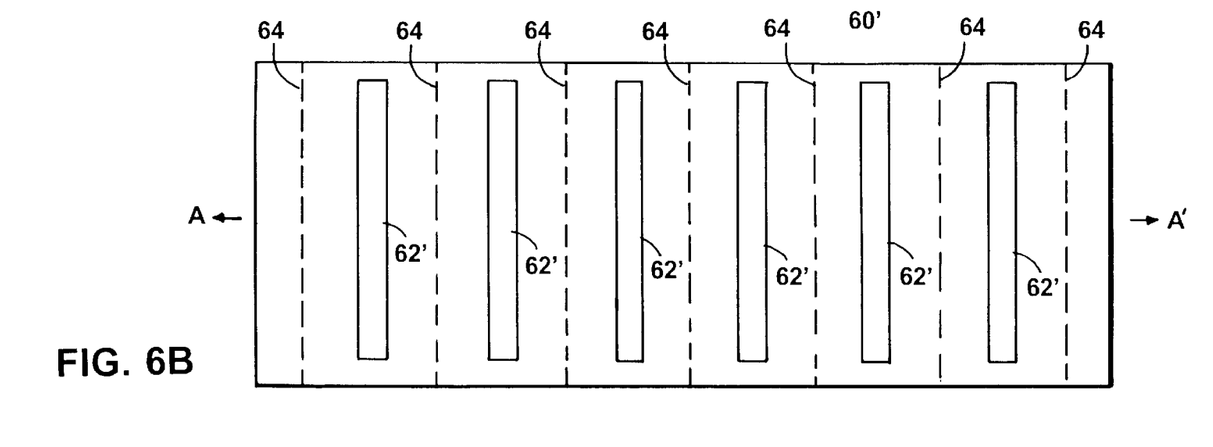

One embodiment of screen 60 (screen 60') is shown in FIGS. 6A (cross-sectional view along the line A-A') and 6B (plan view). Screen 60' is made from a row of parallel rods 64 connected to one another at their ends. Each rod 64 has a triangular cross-section substantially in the shape of an equilateral triangle with one vertex pointing upward, substantially perpendicular to the transverse dimension of screen 60'. Rods 64 are equally spaced from one another to provide rectangular gaps 62'. The triangular configuration of rods 64 allow agglomerated particulates to gather downward momentum by sliding down the triangular sides 66 of rods 64. A suitable length for the upper two sides of the triangular rods is in the range of about 1 to 4 inches, or more particularly, in the range of about 1.5 to 2 inches. A suitable gap spacing between the rods is in the range of about ⅛ to 1 inches, or more particularly, in the range of about ¼ to ½ inches. Triangular configurations other than equilateral can also be used. For example, a suitable angle for the upper vertex of the triangular rods is in the range of about 40 to 90 degrees, or more particularly, in the range of about 55 to 70 degrees. Also, the rods can be hollow. For example, the rods can be formed by bending metal sheets into a hollow triangular rod. Furthermore, each sheet can be bent into an inverted "V" so that only the upper two sides of the triangle are formed. In other embodiments, the rods can have curved rather than triangular cross-sections. For example, circular rods can be used, in which case agglomerated particulates can slide along the downward curving surface of the rods and through the gaps.

Further embodiments can include many different configurations for the screen. For example, the screen can be formed from a perforated metal sheet having a two-dimensional array of holes as the gaps, unlike the one-dimensional row of rectangular gaps 62' shown in FIGS. 6A and 6B. In general, the screen is designed to produce a more uniform velocity distribution for the rising gases and to allow particulates that settle out of the gas stream to fall back through the gaps in the screen, during which time the particulates may agglomerate or cluster with one another.

Figure 5B:
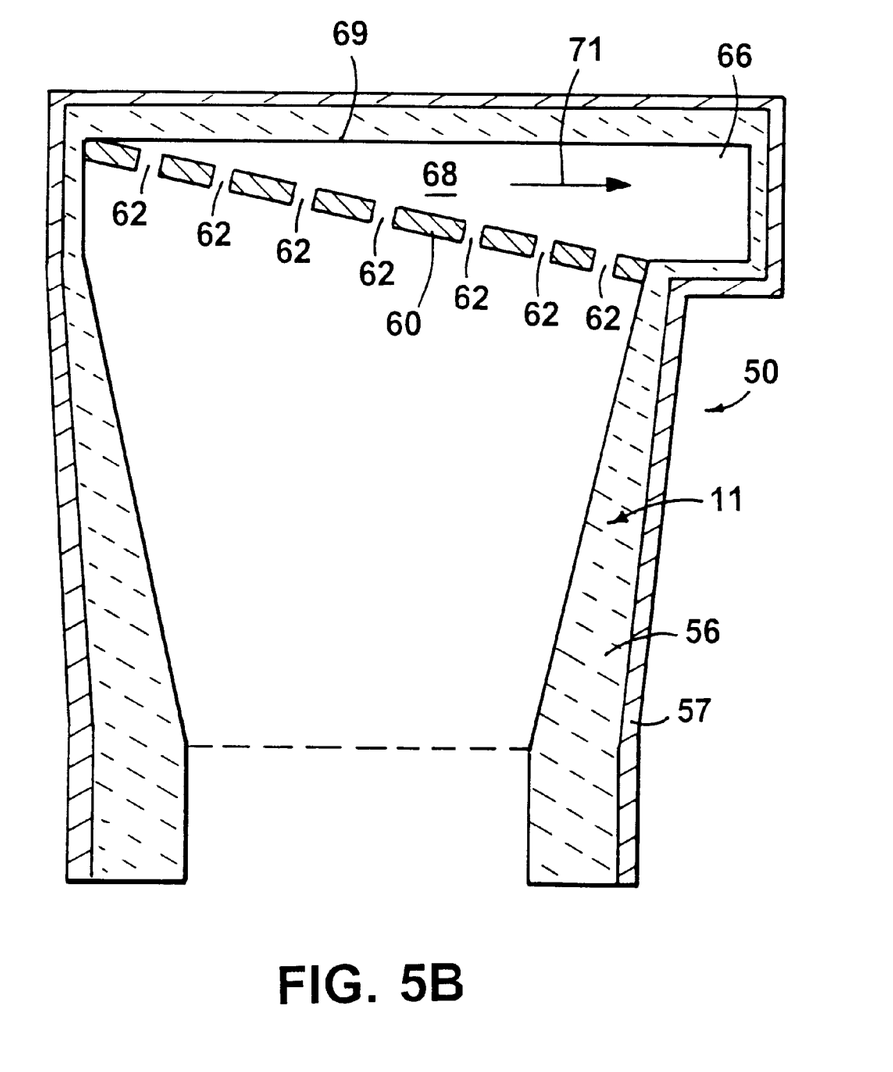

Referring again to FIG. 5A, gases exit disengagement section 50 through a side-channel 66 near a side of the duct 68 above screen 60. To minimize the pressure drop across the top of the duct and to redirect the gases toward the side channel, the volume of duct 68 above screen 60 increases in the direction of side-channel 66. As shown in FIG. 5A, screen 60 is oriented substantially perpendicular to the height of heat exchanger 10 and the upper wall 69 of duct 68 angles upward toward side-channel 66 to provide increasing volume in duct 68 in the direction of side-channel 66. Alternatively, screen 60 can be oriented at an angle to the height of stack 11 in order to produce the increasing volume (in the direction of side channel 66) in duct 68 above screen 60, as shown in FIG. 5B. A suitable angle for the orientation of the screen is in the range of about 5 to 45 degrees (from the transverse dimension of the stack), and more preferably in the range of about 15 to 30 degrees (from the transverse dimension of the stack). Other embodiments can include a combination of the structures shown in FIGS. 5A and 5B. That is, the upper wall 69 of duct 68 angles upward toward side-channel 66 and screen 60 is oriented at an angle to the height of stack 11, thus producing the increasing volume (in the direction of side channel 66) in duct 68 above screen 60.

Figure 5C:
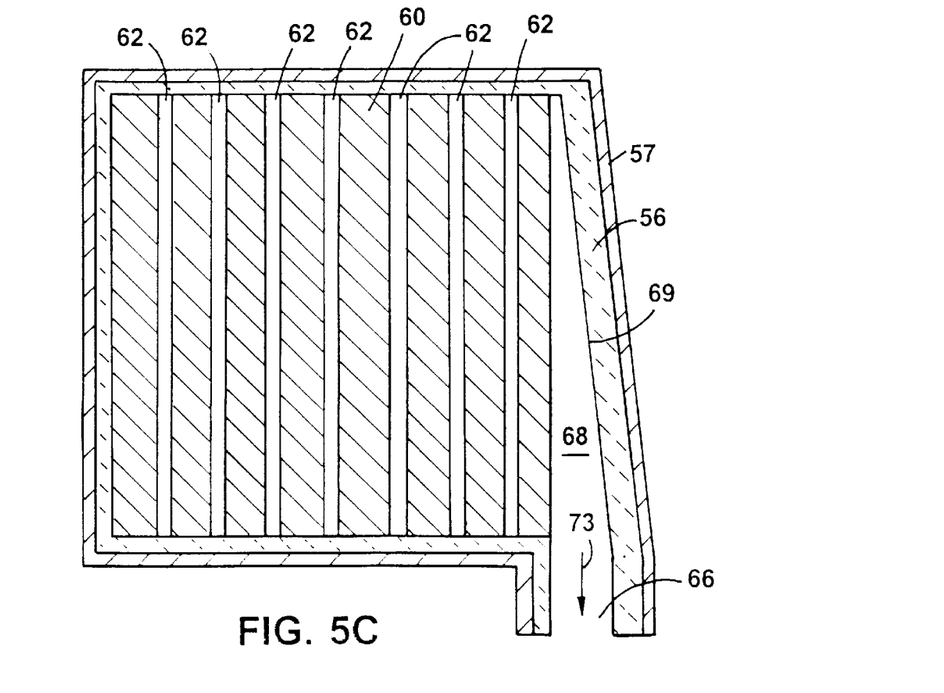

In any of these embodiments, the shape of duct 68 directs the gases through a turn of approximately 90 degrees so that they flow with a substantially uniform profile toward side-channel 66 in the direction of arrow 71, which is substantially perpendicular to stack 11. As shown in FIG. 5C, which is a top view of the disengagement section for either of the embodiments shown in FIGS. 5A and 5B, the side-wall 69 of duct 68 is also angled to then direct the gases through a second turn of approximately 90 degree so that the gases flow into side-channel 66 in the direction of arrow 73, which is also substantially perpendicular to stack 11. Thus, the design of duct 68 directs the rising gases through two 90 degree turns that produce a substantially uniform flow profile and reduces the cross-sectional area of the flow as it pass into side-channel 66. The reduction of the cross-sectional area of the flow is necessary to introduce the gases from the stack into a cyclone, which can have an inlet opening area that is as small as about twenty square inches.

Referring to FIG. 1, side-channel 66 directs the gas flow exiting heat exchanger 10 into cyclone 52. Cyclone 52 mechanically separates from the exhaust gases small particulates that pass through screen 60 and remain entrained in the gas flow. Cyclone 52 has a cylindrically shaped upper portion 70 connected to a funnel shaped lower portion 72. Side-channel 66 brings gas into cyclone 52 tangential to the inner wall of portion 70. Centrifugal force separates entrained particulates from the gas flow as the particulates collide with the inner walls of cyclone 52. The separated particulates slide down the inner walls into lower portion 72, which funnels them into a pipe 74 that guides the particulates back into the heat exchanger. Gases in cyclone 52 cycle around portions 70 and 74 and return upward through the center of cyclone 52, and thereafter escape through an exhaust opening 76 at the top of the cyclone. A heat exchanger employing a cyclone is further described in Cole et al. (U.S. Pat. No. 5,125,943), the contents of which are incorporated by reference.

Heat exchanger 10 includes eductor 54 operating in conjunction with cyclone 52. Eductor 54 supplies a jet of air 53 into pipe 74 in the direction of heat exchanger 10 to more strongly draw particulates back into the heat exchanger. By using eductor 54 many fewer particulates remain entrained in the gas flow and escape through exhaust opening 76. The eductor provides a continuous flow of material from cyclone 52 back into heat exchanger 10. In particular, since eductor 54 opposes the pressure difference between the cyclone and the heat exchanger, particulates captured by cyclone 52 can flow through pipe 74 and be reintroduced directly into active section 16, where they are remixed with particulate matter falling from distribution section 14. Also, as the particulates return to active section 16 by flowing through lower portion 72 and pipe 74, they can agglomerate into larger particulates that will not be recaptured by the rising gases in the active section. The eductor also recycles some of the gases in cyclone 52 back into active section 16.

Air supplied to eductor 54 is heated to a temperature sufficient to prevent condensation of moisture in the pipe 74. Additionally, cyclone 52 and pipe 74 are insulated to prevent cool spots which might also cause condensation. It is important that condensation of moisture is prevented, otherwise particulates in the pipe can become sticky and block the particulate flow through the pipe.

The jet of air 53 provided by the eductor is set to just slightly overcome the pressure drop between the cyclone barrel and the heat exchanger, thereby creating the particulate flow from the eductor to the heat exchanger. This pressure drop is typically from about 1" to 4" (inches) of water column (w.c.). Note that 27.7 inches of water column corresponds to one pound per square inch (psi). In other embodiments, a rotary valve within pipe 74 can be used in place of eductor 54, in order to overcome the pressure difference and create the continuous particulate flow.

As described previously, the heated particulate material collects in hopper section 20 near the bottom of stack 11, which funnels the material into bottom charger 22. The collected material may have fallen directly through active section 16, it may have been captured by the rising gases and separated from them by disengagement section 50 before falling through active section 16, or it may been captured by the rising gases and separated from them by cyclone 52 before being reintroduced into active section 16.

Alternatively, in other embodiments, pipe 74 connects to stack 11 below hot gas inlet 18 and reintroduces the separated particulates directly into the hopper section. In this case, to remix these particulates with the particulates falling through stack 11, the hopper section includes a cascading duct that combines the particulates into a single particulate stream and has baffles to fold the particulate stream over itself numerous times.

In another embodiment, hopper section 20 is replaced with an active hopper section adjacent hot gas inlet 18. The active hopper section funnels the heated particulates into bottom charger 22 while also including baffles to retard the falling particulates and spread the hot gases across the interior cross-section of stack 11. By retarding the falling particulates, the baffles increase the heat exchange between the gases and particulates in the same ways as the baffles in active section 16. As a result, the active hopper section reduces the overall height of the stack by both consolidating the falling material and also prolonging heat exchange.

Figure 7:
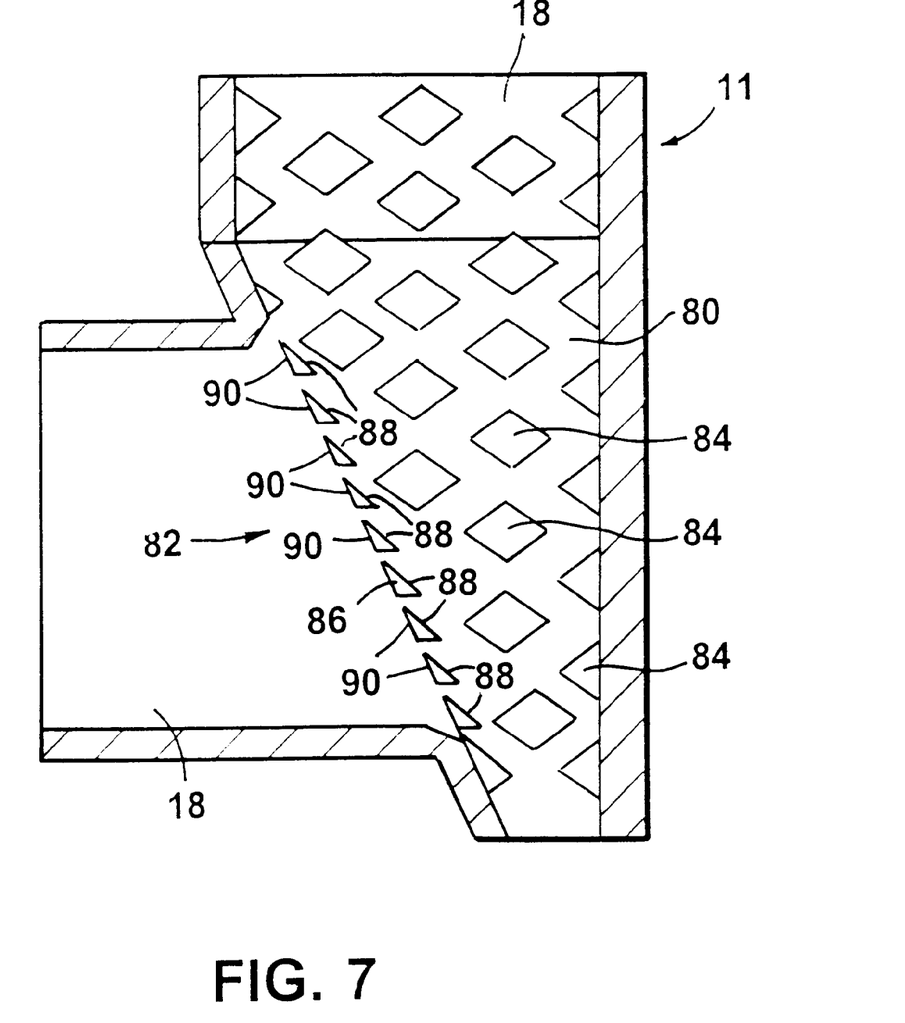
FIG. 7 is a schematic of an active hopper section for the heat exchanger shown in FIG. 1.

Referring to FIG. 7, one configuration of an active hopper section 80 is shown. The cross-sectional area of active hopper section 80 increases with height by using a ramped wall 82 adjacent to the hot gas inlet 18. Section 80 includes diamond shaped baffles 84 to retard the downward flow of the particulates and distribute the hot gases. A screen 86 separates hot gas inlet 18 from section 80. Screen 86 is made of a series of spaced triangular tubes 88. The spaces between the tubes spread out the rising gases and the downward sloping sides 90 of the triangular tubes allow falling particulates to slide down their surfaces toward the bottom charger. Many other configurations are also possible. For example different types of screens can be used, the gas inlet can be adjacent a perpendicular rather than a ramped wall, the section can include gas inlets on multiple walls, and the section can also include multiple ramped walls to funnel the falling particulate material.

The internal and external structure of stack 11 will depend on the application of heat exchanger 10. For example, applications involving preheating cullet and batch for subsequent glass manufacturing require that the preheated material not be contaminated by the materials within the preheater. In this case, the internal walls of stack 11 are constructed from stainless steel, while the external walls of stack 11 include insulation. In applications, such precalcining limestone, temperatures within the heat exchanger can be large enough (i.e. greater than 1400° F.) to adversely affect the structural and chemical stability of the structural material. In these cases, stack 11 is constructed with an external carbon steel support structure having its internal walls lined with an intermediate refractory insulation layer and an exposed abrasion resistant refractory liner. Carbon steel is less expensive than stainless steel, thereby minimizing cost, and the intermediate layer insulates the carbon steel support structure and is protected from the falling particulate material by the abrasion resistant liner, in much the same way as the materials in the high temperature baffle described earlier. Examples of suitable refractory insulation, which tend to be light and porous, are available from RESCO Products Inc. (Norristown, Pa.) and include RESCO RS-3A, while examples of suitable abrasion-resistant refractory, which tend to be dense, include RESCO Sureflow® 70LC or 52LC. These materials can also be used in the high temperature baffle.

In another embodiment of heat exchanger 10, screen 60 is replaced with filter media such as filter bags, ceramic candles, or a ceramic monolith. Filter media such as these are well known in the art, see, e.g., Jacqueline I. Kroschwitz (ed.), *Kirk-Othmer Encyclopedia of Chemical Technology* (4th edition), Vol. 10, pp. 788–853 (John Wiley & Sons, New York, 1993), the contents of which are incorporated herein by reference. The filter bags are made out of a porous fabric or weave that includes, for example, polyester, cotton, or Nylon. A mesh can be used to support a plurality of upright-hanging filter bags in order to form what is known as a baghouse. The bags are arranged in the baghouse such that gas passing through the baghouse must pass through the fabric of at least one bag. The ceramic candles are closed-end, porous ceramic tubes that can be arranged in a manner similar to the bags in a baghouse. Use of a filter bags or ceramic candles increase the surface area of the filter media for a given cross-section. Suitable ceramic candles can be obtained from Ceramem, Inc. (Waltham, Mass.). Alternatively, a ceramic monolith, which is a sheet of porous, ceramic material, can be used as a filter medium. A suitable ceramic monolith can be obtained from Corning Glass Co. (Corning, N.Y.). Typically, in thermal processing with hot gases, these types of filter media are used for removing particulates from dusty gases prior to directing the gases into a stack.

In this embodiment of the invention, the filter media replace the screen in disengagement section 50 near the top of heat exchanger 10. The filter media are sufficiently porous to allow the hot rising gases to pass through them while trapping particulate material entrained in the rising gases. The exact type of filter media is chosen according its thermal stability (with regard to the hot gases) and the size range of the particulate material to be trapped. The heat exchanger also includes a mechanical vibrator, such as a foghorn, or at least one air jet, which periodically produces a pressure pulse in the filter media that separate the trapped particulate from the filter media so that the particulates fall back through stack 11. Depending on the size distribution of the feed material and the characteristics of the filter media, heat exchanger 100 can also include an inertial separator (such as a cyclone) or an impact separator (such as a duct with a sharp angle or a screen) for removing particulates from the rising gases prior to the filter media in order to reduce of particulate loading of the filter media.

Figure 8:
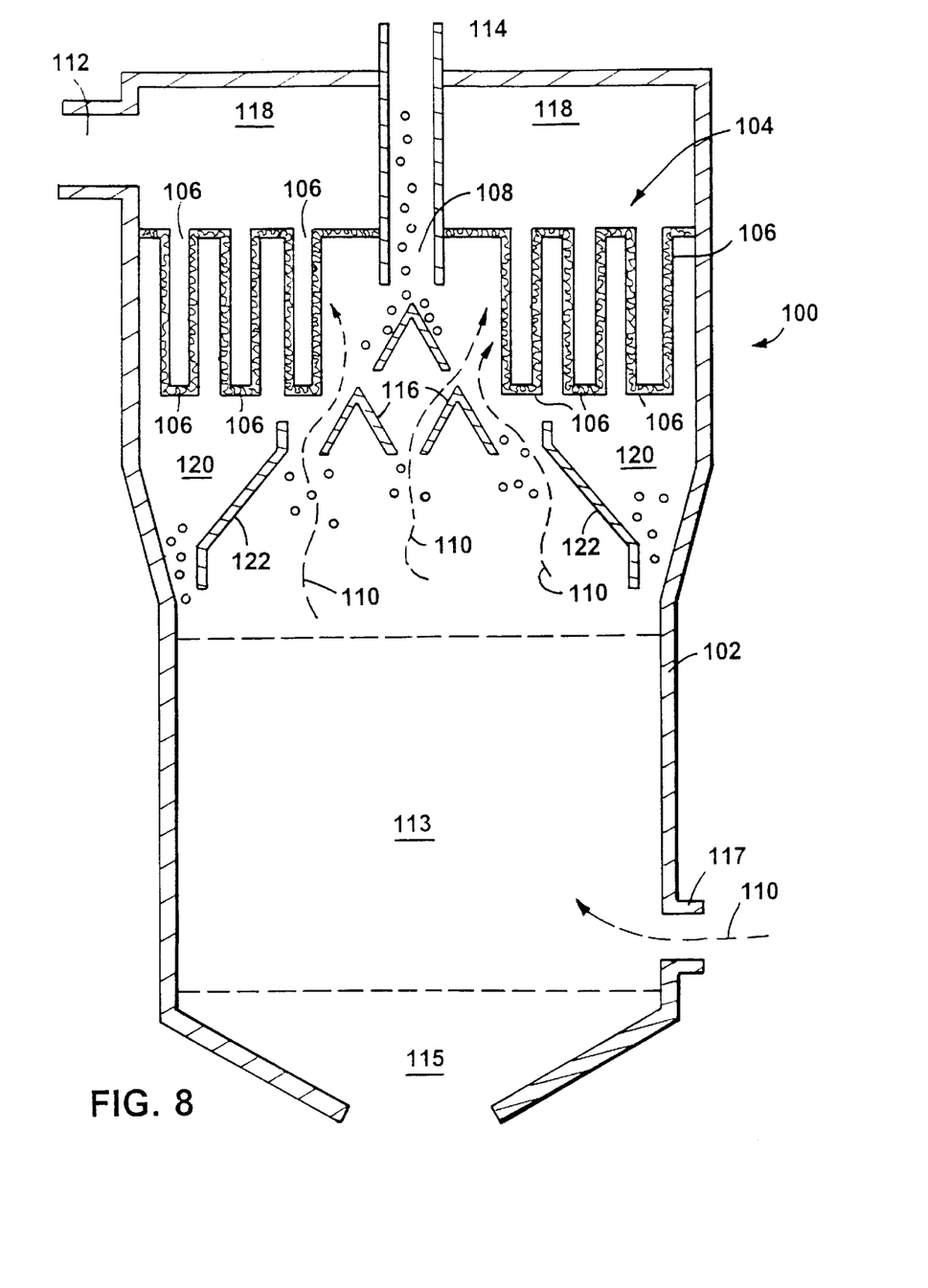
FIG. 8 is a schematic of an alternative embodiment of the heat exchanger in which the disengagement section employs a baghouse in place of the screen.

FIG. 8 shows another embodiment of a heat exchanger 100, which includes a disengagement section 102 that, for example, employs a baghouse 104 rather than a screen. The baghouse supports a plurality upright-hanging tubular bags 106 made from, for example, polyester fabric. Bags 106 are arranged such that rising hot gases 110 (dashed curve) must pass through at least one bag in order to exit stack 102 (through a side channel 112). The bags 106 can withstand the high temperatures in the disengagement section (e.g., greater than 800° F.) and have a porosity sufficient to allow the rising gases to pass while trapping particles entrained in the rising gases. The bags are chosen to have a porosity that corresponds to the size of the finer particulates in the feed particulate material.

The feed particulate material is fed into heat exchanger 100 at the top of stack 102 through a feed-inlet pipe 114 that extends through baghouse 104 and releases the particulate material 108 into a number of baffles 116 that spread the falling particulate material across the cross-section of stack 102. Thereafter, the particulate material falls through a baffle-containing active section 113 and a hopper section 115 that are similar to those described earlier with regard to heat exchanger 10. Rising hot gases 110, which enter the stack through a gas inlet 117, heat the falling particulate material and entrain some the finer particulate material. Baghouse 104 removes the entrained particulates from the rising gases, which then pass into a clean air (i.e., substantially particulate free) plenum 118 and on through side channel 112. A mechanical vibrator (not shown) separates the trapped particulates from baghouse 104 so that they fall into a quiescent zone 120 where they can fall freely and subsequently remix with larger particulate material as they fall through active section 113. Quiescent zone 120 can be formed by a pipe or duct shielding 122 the separated fine particulate material from the rising gases. Alternatively, or in addition, quiescent zone 120 can be formed in a low velocity region of the stack such as the regions adjacent to the side walls of the stack.

Using the Heat Exchanger in Glass Manufacture

Heat exchanger 10 can be used as a preheater that efficiently cools exhaust gases from a glass furnace by preheating the batch and cullet feed material for the furnace. The exhaust gases from the furnace are directed into heat exchanger 10 through gas inlet 18 and the unheated feed material is supplied by feeder system 12. When manufacturing glass, it is important that the composition of the feed material supplied to heat exchanger 10 remains substantially the same as the preheated material exiting heat exchanger 10. This means that the majority of elutriated small particulates (greater than 99%) must be recaptured and remixed with the remainder of the preheated feed material exiting the heat exchanger. Furthermore, in some applications, the composition of the feed material changes over time. In these cases, the recapture and remixing should happen continuously and at a rate faster than the rate at which the composition of the feed material is changing. Disengagement section 50, and cyclone 52 combined with eductor 54 (or alternatively, a cyclone combined with a rotary valve) allow heat exchanger 10 to meet these criteria.

In one example, heat exchanger 10 was used to continuously preheat cullet and batch feed material for 12 hours using 1300° F. inlet gases. The cullet and batch inflow rate was about 200 pounds/hour and the maximum gas velocity was kept below 5.5 feet/second. Under these conditions, the cullet and batch was preheated to about 1000° F. upon exiting the heat exchanger. Dust in the cyclone exhaust was measured to determine the fraction of feed material lost by elutriation. Even without using the eductor, the dust in the cyclone exhaust was less then 0.5% of the cullet and batch inflow rate. By reintegrating material captured by the cyclone into the heat exchanger using the eductor, the dust in the cyclone exhaust was less 0.02% of the cullet and batch inflow rate. The eductor improved the performance of the cyclone by continuously removing the particulates that the cyclone had captured.

When preheating feed material for manufacturing glass, it is also important that there is no wear from the baffles or walls of the heat exchanger that can contaminate the preheated feed material. In the above example, the baffles and inner walls of heat exchanger 10 were made of stainless steel. Spectroscopic measurements of glass made from the preheated batch and cullet material indicated that there was no detectable presence of chromium or iron from stainless steel wear.

Using the Heat Exchanger to Precalcine Limestone

Heat exchanger 10 can also be used to efficiently cool exhaust gases from a calciner furnace by using the exhaust gases to preheat and precalcine limestone feed material for the calciner. The calciner furnace typically includes a jet that suspends particulates of limestone feed material and heats them with hot gases at about 1900° F. The hot gases calcine the limestone ($CaCO_3$) to lime (CaO), driving off carbon dioxide ($CO_2$). Since lime is less dense than limestone it escapes from the top of the suspension and is subsequently collected. The exhaust gases from the calciner leave at about 1900 to 2000° F. These gases are directed into hot gas inlet 18 in heat exchanger 10 where they preheat and partially calcine limestone feed material introduced into stack 11 through feeder system 12. The preheated and partially calcined limestone feed material is then fed to the calciner.

The partial calcination of limestone in heat exchanger 10 requires hot gas temperatures of at least between 1400 and 1600° F. The baffles increase the residence time of the falling limestone in stack 11, thereby enhancing the calcination. Heat exchanger 10 extracts energy from the calciner exhaust gases by preheating, partially reacting, and removing moisture from the limestone feed material. In particular, the conversion of limestone to lime is an endothermic reaction that requires energy. Integrating heat exchanger 10 with the calciner furnace increase the efficiency of the overall calcination process. To accommodate the high temperatures involved in preheating the limestone, the heat exchanger should incorporate the hot baffle design and the internal insulation described previously.

The requirements for acceptable levels of elutriated particulates in the exhaust gases from the heat exchanger are less stringent in limestone processing than in glass manufacture, primarily because compositional uniformity is not an issue (i.e., all of the feed material is limestone). Nonetheless, particulates lost to the atmosphere waste starting material and are pollutants. A suitable target level for lost particulates is less than about 10%. By employing the disengagement section described above, the heat exchanger easily meets this target. Another advantage of heat exchanger 10 is that the raining bed design allows even small (i.e., less than a quarter inch diameter) limestone feed particulates to be efficiently preheated.

In one example, heat exchanger 10 heated room temperature limestone feed material to greater than 1200° F. and achieved greater than 11% calcination using 1900° F. hot inlet gases. In this case the inlet gas flow rate was 2100 pounds/hour and the inlet limestone flow rate was 1600 pounds/hour.

OTHER EMBODIMENTS

It is to be understood that while the invention has been described in conjunction with the detailed description thereof, that the foregoing description is intended to illustrate and not limit the scope of the invention, which is defined by the scope of the appended claims. For example, the disengagement section in the heat exchanger can connect to multiple cyclones rather than only a single cyclone. Also, to reduce the height of the heat exchanger, it can be constructed with multiple shafts and a mechanical pneumatic lift system, which moves the heated particulate matter from the bottom of one shaft to the top of the next shaft.

In general, the raining bed heat exchanger described above can be used to heat any type of particulate matter to a temperature below its melting temperature. The heat exchanger can also be used to heat cool gases with hot particulate matter by providing rising cool gases at the bottom of the stack and hot particulate matter at the top of the stack.

Other aspects, advantages, and modifications are within the scope of the following claims.

What is claimed is:

1. A raining bed heat exchanger comprising
   a hollow stack;
   a feed inlet located near the top of the stack for introducing particulate material into the stack so that the material falls through the stack;
   a gas inlet located near the bottom of the stack for introducing rising gases into the stack so that the gases flow counter to the falling material;

a plurality of baffles supported within the stack between the feed and gas inlets for retarding the falling material and prolonging its exposure to the gases; and a disengagement section located near the top of the stack where particulates entrained by the rising gases are separated from the gases, wherein the disengagement section comprises:

a screen positioned within the stack above the feed inlet and having a plurality of gaps through which the rising gases pass in order to sufficiently separate the entrained particulates.

2. The heat exchanger of claim 1, wherein the gaps are uniformly distributed across the screen.

3. The heat exchanger of claim 1, wherein the total area of the gaps is less than about one fifth of the total area of the screen.

4. The heat exchanger of claim 3, wherein the total area of the gaps is less than about one tenth of the total area of the screen.

5. The heat exchanger of claim 1, further comprising a mechanical vibrator connected to the screen.

6. The heat exchanger of claim 1, wherein the cross-sectional area of the disengagement section increases with height.

7. The heat exchanger of claim 1, wherein the screen comprises downward sloping surfaces that narrow toward one another to provide the plurality of gaps.

8. The heat exchanger of claim 1, wherein the screen comprises a plurality of rods having a triangular cross-section and wherein the rods are spaced from one another to provide the plurality of gaps.

9. The heat exchanger of claim 1, wherein the disengagement section further comprises a duct on a side of the stack through which the rising gases exit the heat exchanger, and wherein the interior volume of the disengagement section above the screen increases in the direction of the duct.

10. A heat exchanger system comprising the heat exchanger of claim 1 and a cyclone, wherein the heat exchanger further comprises a duct connecting the disengagement section to the cyclone and wherein the rising gases pass through the duct to the cyclone.

11. The system of claim 10, further comprising a pipe connecting the base of the cyclone to the stack below the disengagement section so that particulates separated from the gases by the cyclone are reintroduced into the stack.

12. The system of claim 11, further comprising an eductor to draw the particulates separated by the cyclone through the pipe and into the heat exchanger.

13. The system of claim 11, further comprising a rotary valve in the pipe to drive the particulates separated by the cyclone through the pipe and into the heat exchanger.

14. The heat exchanger of claim 1, wherein at least one of the baffles comprises a hollow tube and refractory insulation surrounding the hollow tube.

15. The heat exchanger of claim 14, wherein the hollow tube is made of steel.

16. The heat exchanger of claim 14, wherein the interior of the hollow tube communicates with the ambient environment to cool the baffle.

17. The heat exchanger of claim 14, wherein at least one of the baffles further comprises an abrasion resistant layer covering at least an upper portion of the refractory insulation.

18. The heat exchanger of claim 17, wherein the abrasion resistant layer comprises stainless steel, refractory tile, or glass.

19. A raining bed heat exchanger comprising:

a hollow stack;

a feed inlet located near the top of the stack for introducing particulate material into the stack so that the material falls through the stack;

a gas inlet located near the bottom of the stack for introducing rising gases into the stack so that the gases flow counter to the falling material; and a plurality of baffles supported within the stack between the feed and gas inlets for retarding the falling material and prolonging its exposure to the gases;

wherein at least one of the baffles comprises a hollow tube and refractory insulation surrounding the hollow tube.

20. The heat exchanger of claim 19, wherein the hollow tube is made of steel.

21. The heat exchanger of claim 19, wherein the interior of the hollow tube communicates with the ambient environment to cool the baffle.

22. The heat exchanger of claim 19, wherein at least one of the baffles further comprises an abrasion resistant layer covering at least an upper portion of the refractory insulation.

23. The heat exchanger of claim 22, wherein the abrasion resistant layer comprises stainless steel, refractory tile, or glass.

24. A heat exchanger system comprising:

a raining bed heat exchanger comprising:

a hollow stack;

a feed inlet located near the top of the stack for introducing particulate material into the stack so that the material falls through the stack;

a gas inlet located near the bottom of the stack for introducing rising gases into the stack so that the gases flow counter to the falling material;

a plurality of baffles supported within the stack between the feed and gas inlets for retarding the falling material and prolonging its exposure to the gases; and a duct in the stack above the feed inlet through which the rising gases exit the heat exchanger;

a cyclone connected to the heat exchanger by the duct for separating from the gases particulates entrained by the gases in the heat exchanger;

a pipe connecting the base of the cyclone to the baffle-containing portion of the stack so that particulates separated from the gases by the cyclone are reintroduced into the baffle-containing portion of the stack; and a flow generating mechanism adapted to continuously pull the particulates separated by the cyclone through the pipe and into the heat exchanger.

25. The system of claim 24, wherein the flow generating mechanism is an eductor.

26. The system of claim 24, wherein the flow generating mechanism is a rotary valve.

27. A raining bed heat exchanger comprising:

a hollow stack;

a feed inlet located near the top of the stack for introducing particulate material into the stack so that the material falls through the stack;

a gas inlet located near the bottom of the stack for introducing rising gases into the stack so that the gases flow counter to the falling material;

a plurality of baffles supported within the stack between the feed and gas inlets for retarding the falling material and prolonging its exposure to the gases; and a disengagement section located near the top of the stack where particulates entrained by the rising gases are separated from the rising gases, wherein the disengagement section comprises:

a filter positioned within the stack above the feed inlet having a porosity that allows the rising gases to pass through the filter and traps the particulates entrained by the rising gases.

28. The heat exchanger of claim 27, wherein the filter comprises a baghouse.

29. The heat exchanger of claim 27, further comprising shielding in the stack below the filter for forming a quiescent zone.

30. A raining bed heat exchanger comprising:

a hollow stack;

a feed inlet located near the top of the stack for introducing particulate material into the stack so that the material falls through the stack;

a gas inlet located near the bottom of the stack for introducing rising gases into the stack so that the gases flow counter to the falling material;

a plurality of baffles supported within the stack between the feed and gas inlets for retarding the falling material and prolonging its exposure to the gases; and a disengagement section located near the top of the stack where particulates entrained by the rising gases are separated by the rising gases, wherein the cross-sectional area of the disengagement section increases with height and wherein the disengagement section comprises:

a screen positioned within the stack and having a plurality of gaps through which the rising gases pass in order to sufficiently separate the entrained particulates.

31. A raining bed heat exchanger comprising:

a hollow stack;

a feed inlet located near the top of the stack for introducing particulate material into the stack so that the material falls through the stack;

a gas inlet located near the bottom of the stack for introducing rising gases into the stack so that the gases flow counter to the falling material;

a plurality of baffles supported within the stack between the feed and gas inlets for retarding the falling material and prolonging its exposure to the gases; and a disengagement section located near the top of the stack where particulates entrained by the rising gases are separated from the rising gases, wherein the disengagement section comprises:

a screen positioned within the stack and having a plurality of gaps through which the rising gases pass in order to sufficiently separate the entrained particulates, wherein the screen comprises downward sloping surfaces that narrow toward one another to provide the plurality of gaps.

32. A raining bed heat exchanger comprising:

a hollow stack;

a feed inlet located near the top of the stack for introducing particulate material into the stack so that the material falls through the stack;

a gas inlet located near the bottom of the stack for introducing rising gases into the stack so that the gases flow counter to the falling material;

a plurality of baffles supported within the stack between the feed and gas inlets for retarding the falling material and prolonging its exposure to the gases; and a disengagement section located near the top of the stack where particulates entrained by the rising gases are separated from the rising gases, wherein the disengagement section comprises:

a screen positioned within the stack and having a plurality of gaps through which the rising gases pass in order to sufficiently separate the entrained particulates, and     a duct on a side of the stack through which the rising gases exit the heat exchanger, and wherein the interior volume of the disengagement section above the screen increases in the direction of the duct.

33. A raining bed heat exchanger comprising:

a hollow stack;

a feed inlet located near the top of the stack for introducing particulate material into the stack so that the material falls through the stack;

a gas inlet located near the bottom of the stack for introducing rising gases into the stack so that the gases flow counter to the falling material;

a plurality of baffles supported within the stack between the feed and gas inlets for retarding the falling material and prolonging its exposure to the gases;

a disengagement section located near the top of the stack where particulates entrained by the rising gases are seperated from the rising gases, wherein the disengagement section comprises a filter positioned within the stack having a porosity that allows the rising gases to pass through the filter and traps the particulates entrained by the rising gases; and shielding in the stack below the filter for forming a quiescent zone.

\* \* \* \* \*